(12) United States Patent
Venkataramani et al.

(10) Patent No.: US 7,854,222 B2
(45) Date of Patent: Dec. 21, 2010

(54) PYROCATALYTIC COATINGS FOR HEATING DEVICES

(75) Inventors: Venkat Subramaniam Venkataramani, Clifton Park, NY (US); Hrishikesh Keshavan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 224 days.

(21) Appl. No.: 12/146,533

(22) Filed: Jun. 26, 2008

(65) Prior Publication Data

US 2009/0325782 A1    Dec. 31, 2009

(51) Int. Cl.
F24C 15/00    (2006.01)

(52) U.S. Cl. .................. 126/19 R; 110/336; 502/304

(58) Field of Classification Search .......... 502/304; 126/19 R; 110/336
See application file for complete search history.

(56) References Cited

U.S. PATENT DOCUMENTS

| 3,266,477 A | * | 8/1966 | Stiles | 126/19 R |
| 3,761,293 A | * | 9/1973 | Carini et al. | 501/16 |
| 3,962,561 A | | 6/1976 | Maitenaz | |
| 4,029,603 A | | 6/1977 | Denny et al. | |
| 6,314,870 B1 | | 11/2001 | Staller et al. | |
| 7,040,047 B2 | | 5/2006 | Boulud et al. | |
| 7,339,142 B2 | | 3/2008 | Pessayre et al. | |
| 2004/0127351 A1 | * | 7/2004 | Basile et al. | 502/303 |
| 2005/0031519 A1 | * | 2/2005 | Vaughey et al. | 423/263 |
| 2006/0151474 A1 | | 7/2006 | Pessayre et al. | |
| 2007/0179050 A1 | * | 8/2007 | Ma et al. | 502/182 |
| 2009/0149314 A1 | * | 6/2009 | Ernst et al. | 502/22 |

FOREIGN PATENT DOCUMENTS

WO    0003947    1/2000

* cited by examiner

*Primary Examiner*—Timothy C Vanoy
*Assistant Examiner*—Michelle Hou
(74) *Attorney, Agent, or Firm*—Richard D. Emery

(57) ABSTRACT

Heating devices such as self-cleaning ovens include at least one surface comprising metal oxide crystalline catalytic material disposed thereon. The metal oxide crystalline material includes perovskite and perovskite-like materials, pyrochlores, rare earth metal oxides, spinels, and combinations of the foregoing. Also disclosed herein are processes for process for forming a pyrocatalytic coating on a substrate.

19 Claims, 3 Drawing Sheets

Control           LSF with 5% SiO$_2$ binder

LSF without Binder         LSF with Binder

PYROCATALYTIC COATINGS FOR HEATING DEVICES

BACKGROUND

The present disclosure generally related to pyrocatalytic coatings, and more particularly, pyrocatalytic coatings that include a metal oxide crystalline catalyst material for improved cleanability of heating device surfaces.

Heating devices such as ovens, irons, and cooking surfaces, are often covered with a hard and resistant layer so that foodstuffs, starch, dirt, and the like that can build up on surfaces of these devices during use can be readily cleaned. For example, the walls of an oven are often coated with a smooth enamel coating so that foodstuffs do not permanently adhere to the surface and to permit ashing thereof when the oven is in a self-cleaning mode. Self-cleaning modes for current surface finishes generally require exposing the oven interior to temperatures in excess of 850° F. to completely ash the attached foodstuffs, thereby permitting the end user to wipe away the resulting ash from the surface. Because of the high temperatures used during the self-cleaning mode, a significant amount of thermal insulation about the oven interior is required to prevent damage to delicate electronics. For example, wiring currently used to operate the oven typically requires special high-temperature insulation, which represents additional overhead in the manufacture of the oven. To reduce the cost associated with the insulation and enable design changes within the oven chamber, it is desirable to reduce the self-cleaning temperatures. A lower temperature self-cleaning cycle may allow use of conventional insulation in wiring, latches, door construction, fans, and the like, thereby reducing the overall cost and enabling additional product enhancement.

Previous attempts to lower the self-cleaning temperatures have included the use of porcelain enamel coatings that include a fluorocarbon polymer component and an enamel-forming component with the enameled forming component including a lead- and cadmium-free glass frit. However, cleaning cycles using these materials require application of water and/or moisture to be efficient. Other types of coatings included multiple glass frit and catalytic single metal cation oxides, where the metal cation is generally a transition metal selected from elements in periods 4, 5 and 6 of the periodic table or components with low staining properties. In addition, non-oxide coatings deposited by chemical- or plasma vapor deposition have been disclosed. These coatings are generally ineffective at reducing the pyrolysis conditions required for the complete combustion that is desirable for self-cleaning modes used in oven designs.

Accordingly, there is a desire to reduce the pyrolytic conditions for surfaces used in heating devices so as to improve cleanability as well as reduce costs associated with current heating device design, e.g., reduce insulation.

BRIEF SUMMARY

Disclosed herein are heating devices including a pyrocatalytic coating. In one embodiment, the heating device comprises at least one surface comprising a metal oxide crystalline catalyst material selected from the group consisting of perovskite crystalline materials, perovskite-like crystalline materials, pyrochlore crystalline materials, spinel crystalline materials, ilmenite crystalline materials, rare earth metal oxides, and combinations thereof.

In another embodiment, a self-cleaning oven comprises an enameled panel surface defining at least a portion of an oven chamber, the enameled panel surface comprising a layer comprising a metal oxide crystalline catalyst material selected from the group consisting of perovskite crystalline materials, perovskite-like crystalline materials, pyrochlore crystalline materials, spinel crystalline materials, ilmenite crystalline materials, rare earth metal oxides, and combinations thereof, wherein the enameled panel surface reduces a combustion temperature of an organic material disposed thereon relative to an enameled panel surface without the metal oxide crystalline catalyst material.

In still another embodiment, a process for forming a pyrocatalytic coating on a substrate comprises mixing a metal oxide crystalline catalyst material selected from the group consisting of perovskite crystalline materials, perovskite-like crystalline materials, pyrochlore crystalline materials, spinel crystalline materials, ilmenite crystalline materials, rare earth metal oxides, and combinations thereof with a binder material to form a mixture; applying the mixture to the substrate; and firing the substrate at a temperature effective to sinter the mixture and form the pyrolytic coating.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
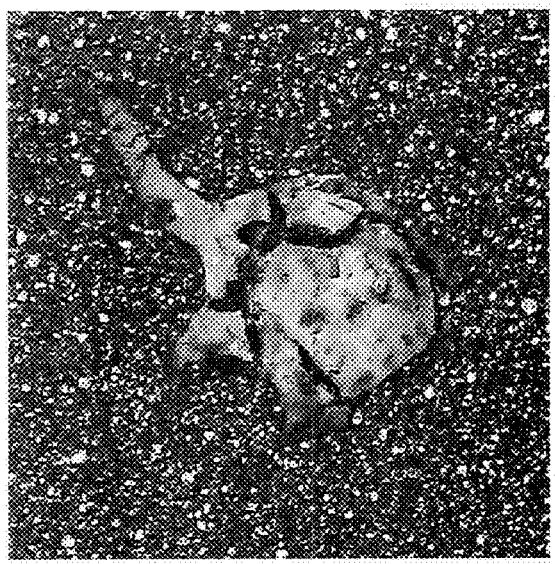
FIG. 1 pictorially illustrates panel sections coated with an enamel (control) and an enamel containing lanthanum strontium ferrite that were subjected to a food stain test after heat treatment at 650° F. (343.3° C.) for 6 hours in oxygen.
Figure 1:

The present disclosure is generally directed to catalytic coatings including a metal oxide crystalline catalyst material so as to provide pyrocatalytic activity for low temperature cleanability.

The metal oxide crystalline catalyst materials include perovskite and perovskite-like materials, pyrochlores, rare earth metal oxides, spinels, and combinations of the foregoing. The catalytic coatings can be used to decrease the pyrolytic conditions, e.g., lower the self-cleaning temperature of, for example, interior oven surfaces using a pyrocatalytic process without the need for the presence of water or moisture. In this manner, the coatings containing the metal oxide crystalline catalyst material can be used to reduce self-cleaning temperatures.

Suitable perovskites are of the formula $ABX_3$, wherein A and B are different cations; and X is an anion such as O, F, and the like. In the perovskite structure, A represents a 12-coordinated large cation and B represents a 6-coordinated smaller cation, wherein the A to B ratio is in the range from about 0.80 to about 1.3. More than one cation for each A and B may be present. A and B may comprise alkali metals, alkaline earth elements, transition metal elements, noble metal elements, or combinations thereof.

As defined above, the number of compounds that fall within the scope of the term "metal oxide crystalline catalyst materials" is relatively large. However, as will be appreciated by those skilled in the art, the compounds and their general crystalline structure are readily recognizable and can be identified by X-ray diffraction. For example, a perovskite $ABO_3$ crystal structure is generally recognizable as a primitive cube, with the B cation in the middle of the cube ("the B lattice site" or "B site"), the A cation in the corner ("the A lattice site" or "A site") and the oxygen anion in the center of the face edges. The structure is stabilized by the 6-fold coordination of the B cation and 12-fold coordination of the A cation.

It should also be noted that the A and B symbols in the $ABX_3$ formula noted above can respectively represent more than 1 cation species, depending on the size and valance states of the species in question. For example, the perovskite can be of the formula $(La_{(1-x)}Sr_x)(Co_{(1-y)}Fe_y)O_3$. In such a case, the A sites in the perovskite crystal lattice are thus filled by either La or Sr and the B sites are filled by either Co or Fe.

In the perovskite-like material, the A and B sites accommodate multiple elements such as was illustrated above—the $(LaSr)CoO_3$. That is, the formula $ABX_3$ has multiple elements for the A and/or B sites. These substitutions on the A-site and B-site ions are generally made with isovalent ions (i.e., cations having the same charge) or aleovalent ions (i.e., cations having a different charge) to accomplish the specific targeted functionality such as catalysis, oxygen transport, electronic conductivity, and the like. Thus, in the general formula $ABX_3$ of the perovskite above, A can be a set of ions A, A2, A3, etc., and/or B can be B, B2, B3, etc.) Substitution of metal aleovalent cations generates non-integral numbers of oxygen atoms in the formula. Other examples of such deviation to stoichiometry are obtained by making a perovskite or a perovskite-like material deficient in the anion.

In the formulas above, the terms "A" and "B" may comprise at least one element selected from the group consisting of alkalis (for example, Na, K, Cs); alkaline earths (for example, Sr, Ba, Ca); and rare earth elements, which, as that term is used herein, includes elements of the lanthanide series of the periodic table (for example, La, Nd, Sm, Gd, Ce, Pr). Other elements include the transition elements from periods 4, 5 and 6 of the periodic table such as oxides of Mn, Co, Ni, Fe, Cu, Ti, Sc, Y, Zr, Nb, Mo, Ru, Hf, Ta, W, Re.

Other suitable metal oxide crystalline catalytic materials include pyrochlores of the general formula $A_2B_2X_7$, wherein A, B, and X are as described above; spinels of the general formula $AB_2X_4$ wherein A, B, and X are as described above; and ilmenite, which is a titanium-iron oxide crystalline material. In some embodiments, the pyrochlore structure are stabilized by a 12-fold coordination of the A cation and a 6-fold coordination of the B cation as noted above. In other embodiments, the pyrochlore structure is stabilized by a 9-fold coordination of the A cation and 6-fold coordination of the B cation. In the spinel structure, A is a site with either tetrahedral (normal spinel) coordination or octahedral/tetrahedral (inverse spinel) coordination, and B is a site with octahedral coordination. A and B are defined above.

The rare earth metal oxides include metal cations selected from the Lanthanide series of the periodic table which contain the atomic numbers from 57 through 71. Exemplary metal cations include cerium, samarium, praseodymium, and the like. In one embodiment, the rare earth metal oxide is a cerium oxide or combinations of cerium with lanthanum oxide or samarium oxide. In one embodiment, the rare earth metal oxide is a solid solution of cerium oxide and another rare earth metal oxide.

Methods for preparing the above noted metal oxide crystalline catalyst materials are generally well known. Suitable methods include calcination, precursor based synthesis such as sol-gel, carboxylate gel process (e.g., Pecchini method), templated synthesis, combustion synthesis including glycine-nitrate synthesis, combustion spray pyrolysis, plasma spraying, etc. Using a glycine nitrate synthesis as an example, an exemplary perovskite $(La_{1-x'}Sr_{x'})_{y'}FeO_{3-\delta}$ can be made in the following manner, wherein the average strontium composition in the A-site, x', is equal to $X_{Sr}/(X_{Sr}+X_{La})$, wherein $X_{Sr}$ and $X_{La}$ are the molar concentrations of strontium and lanthanum respectively, and wherein the average A-site occupation, y', is equal to $(X_{La}+X_{Sr})/X_{Fe}$, wherein $X_{Fe}$ is the molar concentration of iron. The term "$\delta$" is half of x'. Quantities of the nitrate solutions for the respective cations are prepared and mixed with an excess of glycine (up to 5 molar percent). The solution is then dried and heated in a stainless steel beaker with a mesh chimney to approximately 200° C., wherein the glycine-nitrate solution is combusted to produce a fine ash. The resulting ash is calcined at temperatures ranging from 400° C. to 850° C. for two to six hours to obtain the perovskite composition as a powder. The catalyst can be characterized, for example, using x-ray diffraction (XRD) for phase purity and BET for specific surface area. Electron micrographs can confirm the surface morphology.

The metal oxide crystalline catalyst materials can be applied to a base metal substrate as a powder, a powder in a slurry, as a precursor salt in solution, as a sol gel composition over a partially baked cover coat, spin coated, dip coated, screen printed, spray painted and the like, which may then be further processed to the desired finish. The particular application method is not intended to be limited. Alternatively, the metal oxide crystalline catalyst composition can be blended with a top coat as active filler and processed on the substrate as an enamel glaze. Another alterative is to include the metal oxide crystalline catalyst coating on the ground coat itself as the final and functional cover coat.

By way of example, the perovskite and/or perovskite-like catalyst materials can be mixed in appropriate proportions and the resultant composition applied to a substrate such as an aluminum metal (e.g., an oven liner). Depending on the deposition method, the composition may further include water, binders, adhesive promoters, coloring agents, and the like. The composition is then fired (i.e., sintered) at a temperature generally in the range from about 800° F. to about 1600° F. (i.e., 426.7° C. to 871.1° C.). In some embodiments, the thickness of the layer containing the metal oxide crystalline material is less than about 25 microns. Moreover, in certain embodiments the metal oxide crystalline catalyst is present in the top coat in an amount ranging from about 0.1% to about 50% by weight.

Suitable binders include, but are not limited to, polyvinyl alcohol, methacrylates, cellusosic derivatives such as carboxy methyl cellulose, alginates, gums such as gum arabic, agar, agaarose, silicone resins, polymeric phosphates, frit material of borosilicate glass, phosphate, alkaline metal silicates, e.g., fumed silica, and the like. Optionally, the coatings can further include nanoscale particles up to 50wt % of nitrides, carbides, oxynitrides, oxycarbides, mixtures thereof, and the like, to improve non-staining properties.

Examples of suitable metal substrates include steel and aluminum. In certain embodiments, the metal surface to which the coating composition is applied is subjected to degreasing, etching, and neutralization, where applicable.

The following examples are presented for illustrative purposes only, and are not intended to limit the scope of the invention.

EXAMPLE 1

In this example, various catalysts were individually mixed in α-terpineol up to 70wt % using a three-roll mill or a high speed centrifugal mixer to form a homogeneous paste. The catalysts included lanthanum strontium ferrite (LSF), lanthanum strontium cobaltate (LSC), strontium samarium cobaltate (SSC), lanthanum strontium cobalt ferrite (LSCF), cerium oxide ($CeO_2$), and cerium samarium oxide ($Ce(Sm)O_2$). The catalyst paste was painted onto an oven panel section. The coated panel section was dried in an oven at 200° F. (93.3° C.) for 12 hours and then calcined at 925° F. (496.1° C.) in air for 2 hours.

EXAMPLE 2

In this example, the coated panels of example 1 were evaluated to determine the cleanability effectiveness. Approximately 5 g of a processed cheese product commercially available under the trade name CheezWhiz from Kraft foods was used to evaluate the cleanability of the oven panel. CheezWhiz was applied as a food stain to the coated panel using a wooden stick approximately 3 millimeters (mm) in diameter. The diameter of the applied food stain was between 5 mm to 10 mm. The control in the experiment was a standard oven panel cut 1.5"×1.5" from a GE oven currently used in the market.

The testing procedure included heating the panel to 350° F. (176.7° C.) for 1 hour at which time the heat was increased to 450° F. (232.2° C.) for 1 hour. The panels were then cooled to room temperature. After staining the oven panel by heating at the elevated temperatures as noted above, all samples had food stain that could be removed only through scrubbing. The samples were then exposed to a self-clean cycle, which included heating the various stained samples in a box furnace at 650° F. (343.3° C.) for 6 hours in oxygen. FIG. 1 shows the staining test results for one of the perovskite coated samples (e.g., LSF), which was representative of all of the pervoskite catalyst materials, compared to a control without any applied perovskite coating (no coating). As shown, organic soil in the control sample could only be removed using a scrubber after the self-clean cycle whereas the oven panel coated with LSF was completely oxidized without any residual food stain on the panel. It should be noted that the imprint of the food stain in FIG. 1 for the LSF coated panel is likely due to catalyst erosion. Optimization of the coating should effectively remove the erosion, e.g., reduce the thickness of the coating, improve adhesion of the coating onto the oven panel, optimize binders, and the like.

EXAMPLE 3

In this example, under-fired panels were used. The oven panel is typically made of two enamel coatings, the ground coat and the top-coat. Top-coat is applied mainly for aesthetics reasons. This coat is responsible for the glaze that is observed on an oven panel. Calcination proceeds after each coat. Hence, oven panels with ground coat and an unfired top-coat were considered for the study. These panels form the top-coat glaze when heated to temperatures greater than 1150° F.

Figure 2:
FIG. 2 pictorially illustrates a panel section coated with a lanthanum strontium ferrite paste that was deposited on under-fired oven panel sections, calcined at 1200° F. (648.9° C.) for 5 minutes, and subjected to a food stain test after heat treatment at 650° F. (343.3° C.) for 6 hours in oxygen; coated FIG. 3 pictorially illustrates a panel section coated with a lanthanum strontium cobaltate paste that was deposited on under-fired oven panel sections, calcined at 1200° F. (648.9° C.) for 5 minutes, and subjected to a food stain test after heat treatment at 650° F. (343.3° C.) for 6 hours in oxygen.
Figure 3:
Figure 4:
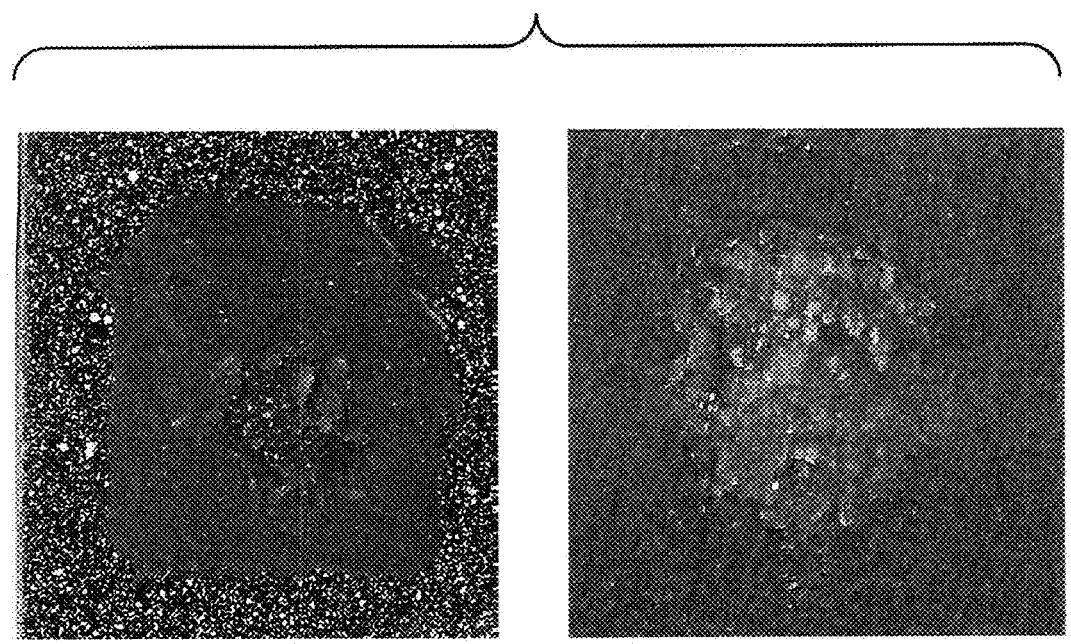
FIG. 4 pictorially illustrates a panel sections coated with lanthanum strontium ferrite, with and without silicate binder, that were subjected to a food stain test after heat treatment at 650° F. (343.3° C.) for 6 hours in oxygen.

Of the catalysts described above, LSC and LSF were each individually coated on the under-fired oven panels and calcined at 1200° F. (648.9° C.) for 5 minutes. No $SiO_2$ binder was added. A glossy, rough surface was formed with the catalytic material on top conducive for cleaning. The panels were tested as described earlier. The results for the oven panels coated with LSF and LSC are shown in FIGS. 2 and 3, respectively. Note that after the self-clean cycle as described above there is no imprint of the food stain in FIG. 2 that was observed in FIG. 1 whereas a food stain imprint was observed in FIG. 3. It is believed that further optimization of the LSC coating will eliminate the food stain imprint because the quantity of catalyst applied to the two panels was not the same. Hence, changing a few parameters in the LSC system will likely result in similar results as in LSF. For example, in order to improve adhesion of the catalyst to the oven panel, binders such as fumed $SiO_2$ can be used. While the addition of the binder has minimal impact on cleanability since it is not catalytic, improved adhesion can directly impact the presence of food stain imprint. FIG. 4 shows an oven panel that has been bake tested and cleaned as described earlier. In this figure, the food imprint has eroded the catalyst. However, in FIG. 1, when the same catalyst was mixed with 5 wt % fumed $SiO_2$ and coated, erosion had been greatly reduced.

Table 1 summarizes the results provided in Examples 2 and 3 relative to the control. The table provides qualitative rankings on a scale of 1 to 5, wherein a panel with a ranking of 1 exhibited poor cleanability, e.g., significant food residue that was not removable with scrubbing; and panel with a ranking of 5 exhibited easy cleanability, e.g., complete combustion of the food stain.

TABLE 1

| Catalyst | Cleanability |
| --- | --- |
| CONTROL | 1 |
| LSF | 4 |
| LSC | 4 |
| SSC | 4 |
| LSCF | 4 |
| Cerium Oxide (CeO2) | 4 |
| Cerium samarium oxide (CeSmO2) | 4 |
| LSF surface modified as in Example 3. | 5 |
| LSC surface modified as in Example 3 | 4 |

1 = poor and 5 = best

Figure 5:
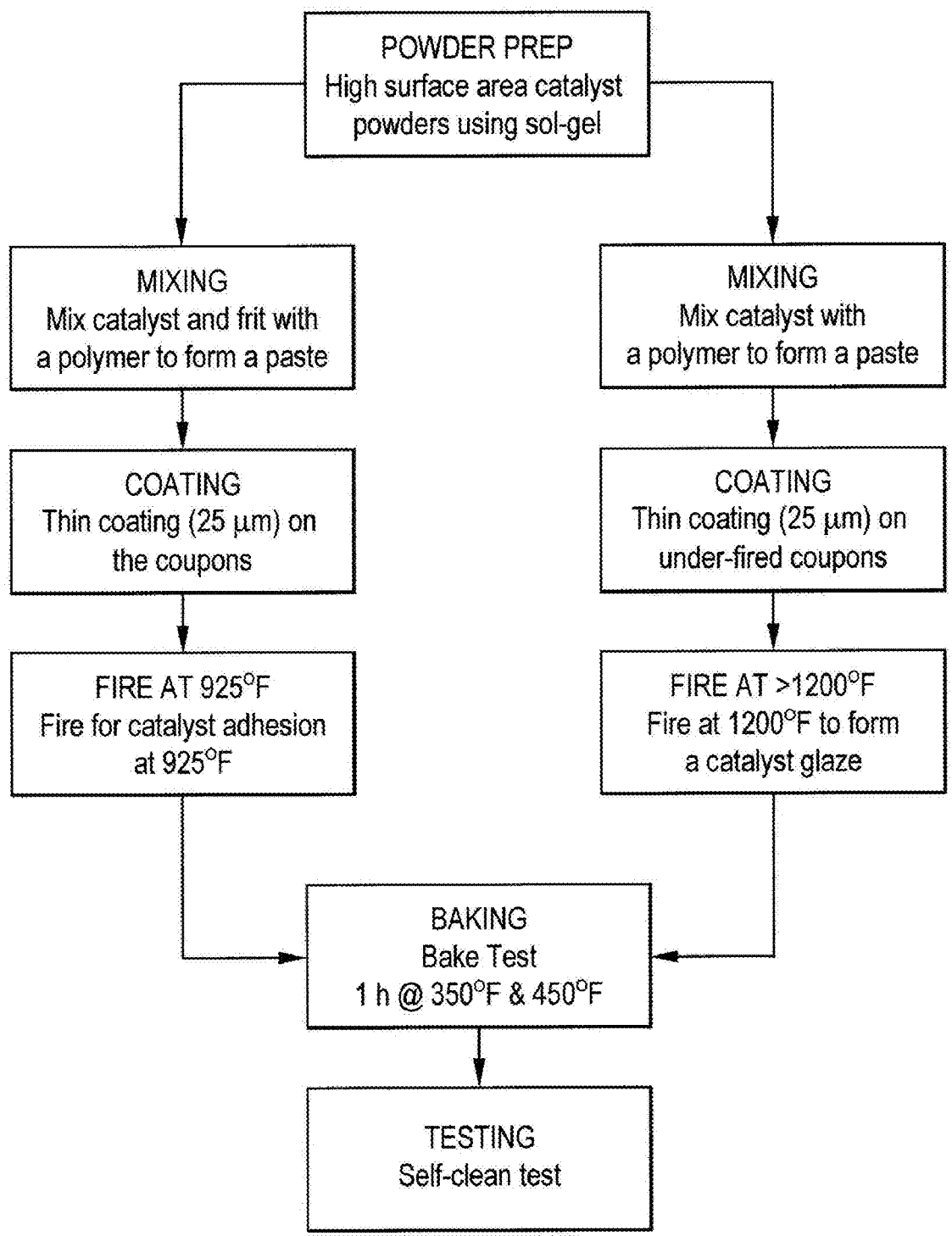
FIG. 5 is a process flow diagram illustrating exemplary processes for depositing the perovskite and perovskite-like coatings onto a base substrate.

FIG. 5 provides a process flow illustrating two exemplary methods for forming the pyrolytic coating and the subsequent self-clean method used in the above examples.

Advantageously, because of its excellent abrasion resistance and food contact resistance, the coating is particularly suitable for application to the interior surfaces of oven cavities, cooking knobs, range tops, burner grates, and like surfaces. In one embodiment, the pyrolytic coatings as described above are effective to combust an organic material such as food matter disposed thereon at a temperature greater than or equal to 575° F. (301.7° C.). In certain embodiments, this temperature is in the range from about 575° F. (301.7° C.) to about 850° F. (454.4° C.).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heating device, comprising:
    at least one surface comprising a metal oxide crystalline catalyst material selected from the group consisting of perovskite crystalline materials, perovskite-like crystalline materials, pyrochlore crystalline materials, spinel crystalline materials, ilmenite crystalline materials, samarium oxide, lanthanum oxide, combinations of any preceding materials, and combinations of rare earth metal oxides with one or more of perovskite crystalline materials, perovskite-like crystalline materials, pyrochlore crystalline materials, spinel crystalline materials, and ilmenite crystalline materials.

2. The heating device of claim 1, wherein the perovskite crystalline materials have a formula of $ABX_3$, wherein A and B are cations and X is an anion, wherein A and B comprise alkali metals, alkaline earth elements, transition metal elements from periods 4, 5, and 6 of the periodic table, noble metal elements, or combinations thereof.

3. The heating device of claim 2, wherein an A to B atomic ratio is between 0.80 to 1.3.

4. The heating device of claim 2, wherein the perovskite crystalline materials are perovskite-like crystalline materials having multiple elements of A and/or B.

5. The heating device of claim 1, wherein the pyrochlores crystalline materials have a formula of $A_2B_2X_7$, wherein A and B are cations and X is an anion, wherein A and B comprise alkali metals, alkaline earth elements, transition metal elements from periods 4, 5, and 6 of the periodic table, noble metal elements, or combinations thereof.

6. The heating device of claim 1, wherein the spinel crystalline materials have a formula of $AB_2X_4$, wherein A and B are cations and X is an anion, wherein A and B comprise alkali metals, alkaline earth elements, transition metal elements, noble metal elements from periods 4, 5, and 6 of the periodic table, or combinations thereof.

7. The heating device of claim 1, wherein the surface comprises a glaze coating, the glaze coating comprising the metal oxide crystalline catalyst material.

8. The heating device of claim 1, wherein the surface comprises a ground coat, the ground coating comprising the metal oxide crystalline catalyst material.

9. The heating device of claim 1, wherein the metal oxide crystalline catalyst material further comprises a binder.

10. The heating device of claim 1, wherein the metal oxide crystalline catalyst material further comprises nano scale particles, the nano scale particles comprising nitrides, carbides, oxynitrides, or oxycarbides.

11. A self-cleaning oven, comprising:
    an enameled panel surface defining at least a portion of an oven chamber, the enameled panel surface comprising a layer comprising a metal oxide crystalline catalyst material selected from the group consisting of perovskite crystalline materials, perovskite-like crystalline materials, pyrochlore crystalline materials, spinel crystalline materials, ilmenite crystalline materials, samarium oxide, lanthanum oxide, combinations of any preceding materials, and combinations of rare earth metal oxides with one or more of perovskite crystalline materials, perovskite-like crystalline materials, pyrochlore crystalline materials, spinel crystalline materials, and ilmenite crystalline materials, wherein the enameled panel surface reduces a combustion temperature of an organic material disposed thereon relative to an enameled panel surface without the metal oxide crystalline catalyst material.

12. The self-cleaning oven of claim 11, wherein the perovskite crystalline material has a formula of $ABX_3$, wherein A and B are cations and X is an anion, wherein A and B comprise alkali metals, alkaline earth elements, transition metal elements from periods 4, 5, and 6 of the periodic table, noble metal elements, or combinations thereof.

13. The self-cleaning oven of claim 11, wherein the layer is a top coat.

14. The self-cleaning oven of claim 11, wherein the perovskite crystalline materials are perovskite-like crystalline materials having multiple elements of A and/or B.

15. The self-cleaning oven of claim 11, wherein the metal oxide crystalline catalyst material further comprises nano scale particles, the nano scale particles comprising nitrides, carbides, oxynitrides, or oxycarbides.

16. A process for forming a pyrocatalytic coating on a substrate, the process comprising:
    mixing a metal oxide crystalline catalyst material selected from the group consisting of perovskite crystalline materials, perovskite-like crystalline materials, pyrochlore crystalline materials, spinel crystalline materials, ilmenite crystalline materials, samarium oxide, lanthanum oxide, combinations of any preceding materials, and combinations of rare earth metal oxides with one or more of perovskite crystalline materials, perovskite-like crystalline materials, pyrochlore crystalline materials, spinel crystalline materials, and ilmenite crystalline materials with a binder material to form a mixture;
    applying the mixture to the substrate; and
    firing the substrate at a temperature effective to sinter the mixture and form the pyrolytic coating.

17. The process of claim 16, wherein the substrate comprises an unfired enamel coating disposed thereon upon which the mixture containing the metal oxide crystalline catalyst material is applied and fired to form a glaze.

18. The process of claim 16, wherein the temperature effective to sinter the mixture is greater than 800° F. (426.7° C.) to 1600° F. (871.1° C.).

19. The process of claim 16, wherein the pyrolytic coating is effective to combust an organic material disposed thereon at a temperature greater than or equal to 575° F. (301.7° C.) to less than or equal to 850° F. (454.4° C.).

* * * * *